United States Patent
Bartfai et al.

(10) Patent No.: US 7,278,049 B2
(45) Date of Patent: Oct. 2, 2007

(54) METHOD, SYSTEM, AND PROGRAM FOR RECOVERY FROM A FAILURE IN AN ASYNCHRONOUS DATA COPYING SYSTEM

(75) Inventors: Robert F. Bartfai, Tucson, AZ (US); Gail A. Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 10/674,872

(22) Filed: Sep. 29, 2003

(65) Prior Publication Data

US 2005/0071708 A1  Mar. 31, 2005

(51) Int. Cl.
G06F 11/00  (2006.01)

(52) U.S. Cl. .......................................................... 714/6
(58) Field of Classification Search ................. 714/6
See application file for complete search history.

(56) References Cited

U.S. PATENT DOCUMENTS

| | | | |
|---|---|---|---|
| 5,155,845 A * | 10/1992 | Beal et al. ...................... | 714/6 |
| 5,504,861 A * | 4/1996 | Crockett et al. ................ | 714/13 |
| 5,544,347 A * | 8/1996 | Yanai et al. .................... | 711/162 |
| 5,555,371 A * | 9/1996 | Duyanovich et al. .......... | 714/13 |
| 5,657,440 A * | 8/1997 | Micka et al. .................. | 714/16 |
| 5,680,580 A | 10/1997 | Beardsley et al. | |
| 5,720,029 A * | 2/1998 | Kern et al. ..................... | 714/20 |
| 5,742,792 A * | 4/1998 | Yanai et al. .................... | 711/162 |
| 5,870,537 A | 2/1999 | Kern et al. | |
| 5,889,935 A * | 3/1999 | Ofek et al. ..................... | 714/6 |
| 6,065,018 A | 5/2000 | Beier et al. | |
| 6,105,078 A | 8/2000 | Crockett et al. | |
| 6,148,383 A | 11/2000 | Micka et al. | |
| 6,148,412 A | 11/2000 | Cannon et al. | |
| 6,189,079 B1 | 2/2001 | Micka et al. | |
| 6,260,129 B1 | 7/2001 | Crockett et al. | |

(Continued)

OTHER PUBLICATIONS

Efficient Management of Remote Disk Subsystem Data Duplexing. IBM Technical Disclosure Bulletin, Jan. 1196, US Volume No. 39 Issue No. 1 Page No. 49-52.*

Primary Examiner—Robert W. Beausoliel, Jr.
Assistant Examiner—Amine Riad
(74) Attorney, Agent, or Firm—Dan Shifrin (57) ABSTRACT

A method of recovery from a data storage system failure in a data storage system having a host computer writing data updates to a local storage controller at a local site. The local controller is associated with a local storage device. The local storage controller is also configured to a synchronously copy the updates to a remote storage controller associated with a remote storage device at a remote site. In addition, the remote storage controller is configured to store a consistent point in time copy of the updates on a backup storage device. The consistent point in time copy is known as a consistency group. Upon detection of a failure associated with the local site, a determination is made whether a group of updates pending for storage on the backup storage device form an intact consistency group. If an intact consistency group has not formed, corrective action may be taken to create an intact consistency group. The recovery method further consists of synchronizing the remote storage device, initiating recovery operations and, upon recovery of the local site, resynchronization of the local storage device and the backup storage device to recovery consistency group without the need for full volume storage copies and while minimizing application downtime.

23 Claims, 6 Drawing Sheets

U.S. PATENT DOCUMENTS

| | | | |
|---|---|---|---|
| 6,304,980 B1 * | 10/2001 | Beardsley et al. | 714/6 |
| 6,308,284 B1 * | 10/2001 | LeCrone et al. | 714/6 |
| 6,463,501 B1 * | 10/2002 | Kern et al. | 711/100 |
| 6,480,970 B1 * | 11/2002 | DeKoning et al. | 714/6 |
| 6,549,992 B1 | 4/2003 | Armangau et al. | |
| 6,654,912 B1 * | 11/2003 | Viswanathan et al. | 714/42 |
| 6,718,352 B1 * | 4/2004 | Dang et al. | 707/205 |
| 6,742,138 B1 * | 5/2004 | Gagne et al. | 714/6 |
| 6,772,303 B2 * | 8/2004 | Crockett et al. | 711/162 |
| 6,813,683 B2 * | 11/2004 | Tabuchi et al. | 711/112 |
| 6,842,825 B2 * | 1/2005 | Geiner et al. | 711/133 |
| 6,948,089 B2 * | 9/2005 | Fujibayashi | 714/6 |
| 7,017,076 B2 * | 3/2006 | Ohno et al. | 714/15 |
| 2002/0133512 A1 | 9/2002 | Milillo et al. | |
| 2003/0028723 A1 | 2/2003 | Segev et al. | |
| 2003/0037247 A1 | 2/2003 | Obara et al. | |
| 2003/0051111 A1 | 3/2003 | Nakano et al. | |
| 2004/0034808 A1 * | 2/2004 | Day et al. | 714/6 |
| 2004/0039959 A1 * | 2/2004 | LeCrone et al. | 714/6 |
| 2004/0260873 A1 * | 12/2004 | Watanabe | 711/114 |
| 2004/0260899 A1 * | 12/2004 | Kern et al. | 711/162 |

* cited by examiner

METHOD, SYSTEM, AND PROGRAM FOR RECOVERY FROM A FAILURE IN AN ASYNCHRONOUS DATA COPYING SYSTEM

RELATED APPLICATIONS

This application incorporates by reference commonly-assigned and co-pending U.S. patent application Ser. No. 10/464,024, filed Jun. 6, 2003, and entitled METHOD, SYSTEM AND ARTICLE OF MANUFACTURE FOR REMOTE COPYING OF DATA. This application also incorporates by reference commonly-assigned and co-pending Ser. No. 10/674,866, entitled METHOD, SYSTEM AND ARTICLE OF MANUFACTURE FOR RECOVERY FROM A FAILURE IN A CASCADING PPRC SYSTEM; Ser. No. 10/675,289, entitled APPARATUS AND METHOD TO COORDINATE MULTIPLE DATA STORAGE AND STORAGE SYSTEMS; Ser. No. 10/676,852, entitled METHOD, SYSTEM AND PROGRAM FOR FORMING A CONSISTENCY GROUP; Ser. No. 10/674,900, entitled AUTONOMIC INFRASTRUCTURE ENABLEMENT FOR POINT IN TIME COPY CONSISTENCY GROUPS; Ser. No. 10/674,845, entitled METHOD, SYSTEM, AND PROGRAM FOR MIRRORING DATA AMONG STORAGE SITES; and Ser. No. 10/675,317, entitled METHOD, SYSTEM AND PROGRAM FOR ASYNCHRONOUS COPY, all filed on Sep. 29, 2003.

TECHNICAL FIELD

The present invention relates to a method, system and article of manufacture for recovery from a failure associated with a storage site in an asynchronous data copying system.

BACKGROUND ART

Disaster recovery systems typically address two types of failures: a sudden catastrophic failure at a single point in time, or data loss over a period of time. In both types of failure scenario, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides the following systems for maintaining remote copies of data at a secondary site, Extended Remote Copy (XRC) and Peer-to-Peer Remote Copy (PPRC). These systems provide a method for the continuous mirroring of data to a remote site to failover to during a failure at the primary site from which the data is being continuously mirrored. Such data mirroring systems can also provide an additional remote copy for non-recovery purposes such as local access at a remote site. These IBM XRC and PPRC systems are described in the IBM publication "Remote Copy: Administrator's Guide and Reference," IBM document number SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing data from the primary DASD. A primary storage controller may be provided to control access to the primary DASD and a secondary storage controller may be provided to control access to the secondary DASD. In the IBM XRC environment, the application system writing data to the primary volumes includes a sysplex timer which provides a time-of-day (TOD) value as a time stamp to data writes. The host system time stamps data sets when writing such data sets to volumes in the primary DASD. The integrity of data updates is related to insuring that updates are done at the secondary volumes in the volume pair in the same order as they were done on the primary volume. In XRC and other prior art systems, the cross systems common time stamp provided by the system on behalf of the application program determines and maintains the logical sequence of data updates across any number of data volumes on any number of storage systems. In many application programs, such as database systems, certain writes cannot occur unless a previous write occurred; otherwise the data integrity would be jeopardized. Such a data write whose integrity is dependent on the occurrence of a previous data write is known as a dependent write. For instance, if a customer opens an account, deposits $400.00, and then withdraws $300.00, the withdrawal update to the system is dependent on the occurrence of the other writes, i.e., the opening of the account and the deposit. When such dependent transactions are copied from the primary volumes to the secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. Consistency groups maintain data consistency across volumes and storage devices. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC environment, the consistency time is the latest time to which the system guarantees that updates to the second volume are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

One technique to maintain consistency across copies is to time stamp data across primary volumes using a common clock source, referred to as a sysplex timer. Updates will be transferred in groups defined as all updates having a time stamp less than a certain time. When clock synchronization cannot be easily implemented to form consistency groups across systems, then another technique for forming consistency groups is to determine a cut off point. Any updates to primary volumes managed by the primary controller cache dated as of the cut off point are transferred to the secondary controller for storage in the secondary volumes. While transferring the data in the consistency group, the primary storage controller would return busy to any host request while the data in the consistency group is transferred. After the data in the consistency group is transferred and the primary and secondary storage controller are synchronized, i.e., any updates prior to the cut off point are transferred, then the primary controller would cease returning busy to the applications. This ensures that the primary and secondary volumes are consistent as of the freeze cut off point.

As is discussed above and as is fully discussed in the commonly assigned and simultaneously filed U.S. application Ser. No. 10/676,852 entitled "METHOD, SYSTEM, AND PROGRAM FOR FORMING A CONSISTENCY GROUP", a storage system failure can result from a sudden or catastrophic failure at a single point in time. Such a failure can be particularly disruptive if a storage controller or storage volume at a primary or local site fails since host I/O operations typically write to the storage system at the local site.

Currently known asynchronous data copying solutions have several scenarios where the resumption of normal operations after a failure at the primary or local site requires the customer to perform a full copy of all volumes maintained at a secondary or recovery site. Full volume copies can take many hours depending on the amount of data stored in the respective volumes. Furthermore, full volume copies can leave the customer exposed to subsequent failures until normal operations can be resumed.

In addition, a data storage system configured across multiple storage sites and having multiple storage volumes and controllers may rely on consistency group formation and consistency group processing to maintain data consistency across volumes and storage devices. A need exists in the art for a mechanism to facilitate the maintenance and manipulation of consistency groups across multiple storage controllers when failure strikes a local controller associated with a local or primary site. Proper use of consistency groups can assure that recovery from a local failure will proceed with minimal data loss and without the need for a time consuming full volume copy.

The present invention is directed toward overcoming one or more of the problems discussed above.

SUMMARY OF THE INVENTION

The need in the art is addressed by a method of recovery from a data storage system failure in a data storage system having a host computer writing data updates to a local storage controller at a local site. The local controller is associated with a local storage device. The local storage controller is also configured to a synchronously copy the updates to a remote storage controller associated with a remote storage device at a remote site. In addition, the remote storage controller is configured to store a consistent point in time copy of the updates on a backup storage device. The consistent point in time copy is known as a consistency group.

The recovery method is triggered by the detection of a failure associated with the local site. Upon detection of a failure associated with the local site, a determination is made whether a group of updates pending for storage on the backup storage device form an intact consistency group. The recovery method ends with the correction of the failure associated with the local site and resynchronization of the local storage device.

After detection of the failure associated with the local site, the recovery method may consist of terminating the asynchronous copying of updates from the local storage controller to the remote storage controller and establishment of a reverse asynchronous update copying relationship from the remote storage controller to the local storage controller. Furthermore, host computer I/O operations are typically quiesced upon detection of the failure associated with the local site.

If it was determined initially that a group of updates pending for storage on the backup storage device did not form an intact consistency group, corrective action may be taken to create an intact consistency group. Depending on the status of the formation of the pending consistency group, the corrective action may consist of completing the pending consistency group, withdrawing the pending consistency group, reverting to a prior, intact consistency group, or allowing the pending consistency group to become the intact consistency group.

The recovery method may also consist of physically copying to the backup storage device, the updates of the intact consistency group forming a recovery consistency group. The method may further consist of synchronizing the remote storage device to the recovery consistency group.

During the time period when the local site is experiencing a failure, I/O updates can be written directly to the remote storage controller. The post failure updates may be written to the remote storage controller from a remote or recovery host.

Upon correction of the failure associated with the local site, the local storage device must be synchronized with the most current data stored on the system, which can comprise synchronizing the local storage device with the recovery consistency group and the post failure updates. Resynchronization of the local storage device can occur over the reverse asynchronous data copying relationship established from the remote storage controller to the local storage controller.

After the local storage device is resynchronized, the recovery process can be completed by quiescing the recovery host, and terminating the asynchronous copying of updates from the remote storage controller to the local storage controller. In addition, the asynchronous update copying relationship from the local storage controller to the remote storage controller can be reestablished. Finally, a new consistent copy of the data on the remote storage device may be stored on the backup storage device. The new consistent copy is preferably made by merging post failure updates written to the remote storage device with the recovery consistency group existing on the backup storage device. Thus, synchronization of both the local storage device and the backup storage device can be accomplished without the need for a full volume copy. In addition, host application downtime is minimized.

DETAILED DESCRIPTION OF THE PREFERRED EMBODIMENT

I. Detailed Description of Underlying Data Copy System

In the following description, reference is made to the accompanying drawings which form a part hereof and which illustrates several embodiments of the present invention. It is understood that other embodiments may be utilized and structural and operational changes may be made without departing from the scope of the present invention.

Figure 1:
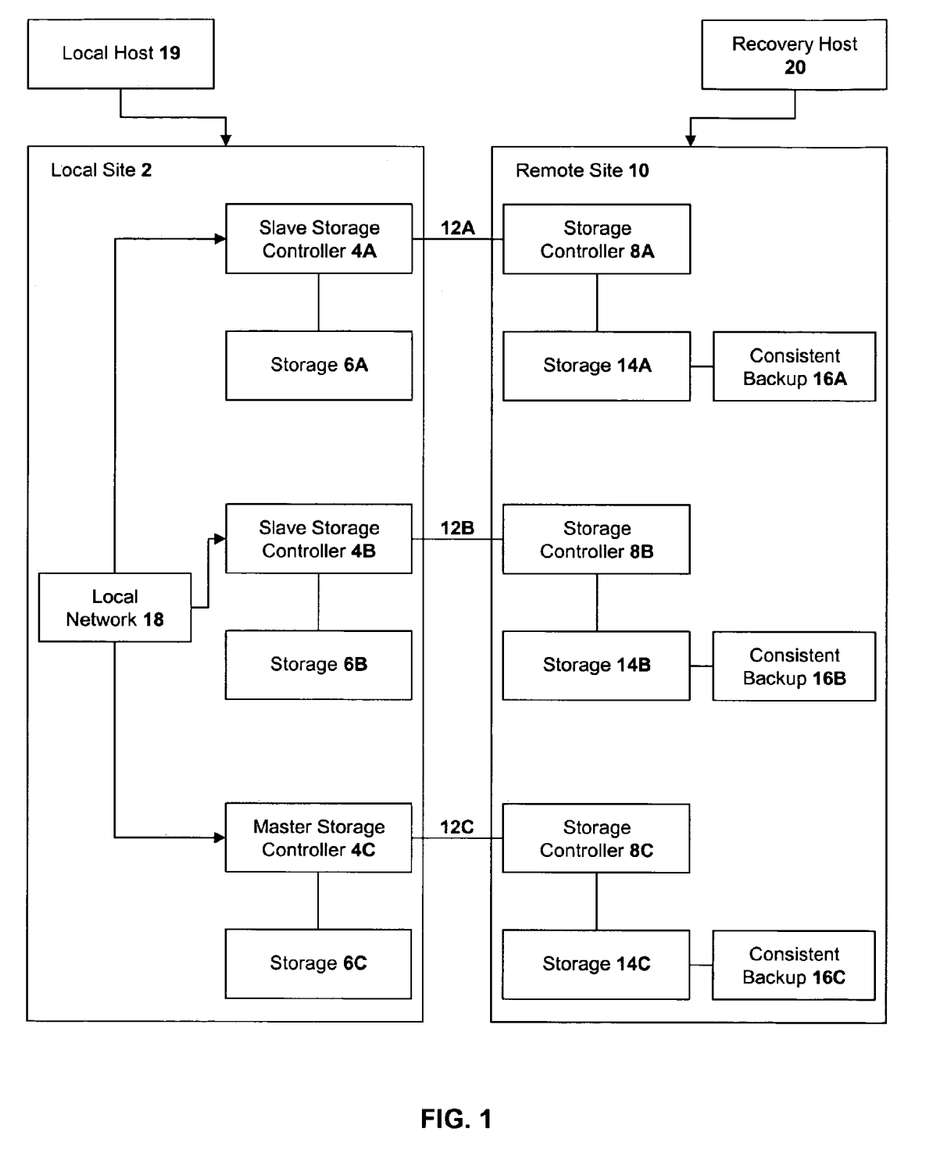
FIG. 1 is a block diagram illustrating a network computing environment in which aspects of the invention are implemented.

FIG. 1 illustrates a network computing environment in which aspects of the invention may be implemented. A local site 2 includes storage controllers 4A, 4B, 4C where each storage controller 4A, 4B, 4C is coupled to an attached storage system 6A, 6B, 6C, respectively. The storage controllers 4A, 4B, 4C manage input/output (I/O) access to volumes in the storage systems 6A, 6B, 6C from local host 18. Each storage controller 4A, 4B, 4C copies data to a corresponding remote storage controller 8A, 8B, 8C at a remote site 10 via connections 12A, 12B, 12C. The storage controllers 4A, 4B, 4C transmit data consistent as of a point of time to the remote storage controllers 8A, 8B, 8C, where the remote storage controllers 8A, 8B, 8C store the data to their respective attached remote storage systems 14A, 14B, 14C. In certain implementations, the storage controllers 4A, 4B, 4C continuously transmit data to the remote site 10, and at certain instances in time will ensure the consistency of the data at the remote site 10. In certain implementations, the remote site 10 may save a consistency group of data to another storage, such as consistent backup storages 16A, 16B, 16C to maintain a backup of the consistent data at the remote site 10. After a consistent group of data is transmitted to the remote storage 14A, 14B, 14C, a copy is made from remote storage 14A, 14B, 14C to a respective consistent backup storage 16A, 16B, 16C. Although FIG. 1 illustrates a certain number of components at the sites, such as three storage controllers and storages, the described implementations may operate with any number of storage controllers and storage systems at the sites.

The remote site 10 may be hundreds or thousands of miles from the local site 2. The connections 12A, 12B, 12C between pairs of storage controllers may comprise a dedicated line, such as a dedicated fiber optical network or connection maintained by a long distance telecommunication carrier, long distant fiber optic connection having channel extenders, or extend through a network such as a storage area network (SAN), local area network (LAN), the internet, an intranet, etc.

Local host 18 at the local site 2 may perform I/O operations with respect to volumes in the storage systems 6A, 6B, 6C. The local host 18 may communicate with storage controllers 4A, 4B, 4C via any network or connection known in the art. The storage controllers 4A, 4B, 4C at the local site may have certain master-slave relationships with respect to the volumes managed by the storage controllers. For instance, storage controller may be designated as a master, e.g., 4C, and other designated as slaves, e.g., 4A, 4B, where certain volumes managed by the designated slaves are managed by the storage controller designated as the master. In this way, one master storage controller may manage remote copy operations for specified volumes for slave controllers designated as slaves for a particular master.

The storage controllers 4A, 4B, 4C and remote storage controllers 8A, 8B, 8C further include a processor complex and may comprise any storage controller or server known in the art such as the IBM Enterprise Storage Server (ESS)®, 3990 Storage Controller, etc. (Enterprise Storage Server® is a registered trademark of IBM). The storage systems 6A, 6B, 6C, remote storage systems 14A, 14B, 14C and backup storage systems 16A, 16B, 16C may comprise an array of storage devices such as just a bunch of disks (JBOD), redundant array of independent disks (RAID), virtualization device, etc.

Figure 2:
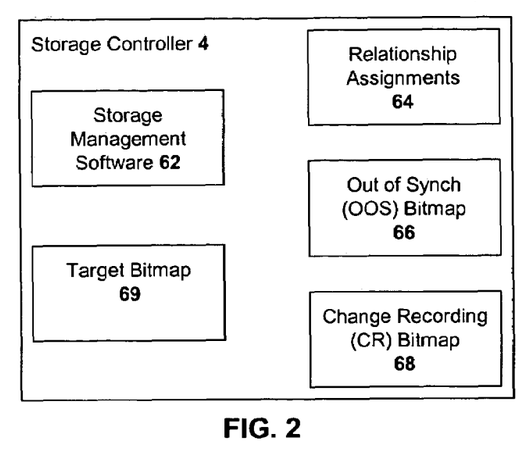
FIG. 2 illustrates an arrangement of a storage controller in accordance with implementations of the present invention.

FIG. 2 illustrates programs and information that may be included in a storage controller 4 at the local site 2, e.g., storage controllers 4A, 4B, 4C, including storage management software 62, relationship assignment information 64, an out of synch (OOS) bitmap 66 and a change recording (CR) bitmap 68. The storage management software 62 may include code to allow for remote copying of data such as the code included in the IBM PPRC Extended Distance program to allow for mirroring of data over relatively short and long distances. Further details of the IBM PPRC Extended Distance program are described in the IBM publication "IBM TotalStorage Enterprise Storage Server PPRC Extended Distance," IBM document number SG24-6568-00 (Copyright IBM, June 2002), which publication is incorporated herein by reference in its entirety. The relationship information 64 maintained by the storage management software 62 includes information for each volume (or portion of a volume) on the storage systems 6A, 6B, 6C subject to a consistency group relationship. For master-slave environments such as that shown in FIG. 1, the relationship information 64 further indicates whether the storage controller is a master for a relationship or whether a volume in the attached storage is a slave in a point in time copy relationship. A storage controller designated as the master storage controller, e.g., 4C, manages consistency group copy operations for designated volumes in its attached storage, e.g., 6C, or volumes in other storage systems, e.g., 6A, 6B, managed by other storage controllers, e.g., 4A, 4B, designated as slaves. Thus, the master-slave designation may be made on a volume by volume basis. In alternative implementations, the master-slave designation may be made at a sub-volume level. Different volumes in one storage controller may be assigned as slaves to different point in time copy relationships. Thus, a master storage controller may control the point in time copy for volumes distributed in the storage systems managed by different storage controllers.

The local storage controllers 4A, 4B, 4C may communicated over a local network 18 which may comprise direct connections or a switched network. Alternatively, the storage controllers 4A, 4B, 4C may communicate over a link 12A, 12B, 12C if the links also extend through a network at the local site 2.

In further implementations, the mirroring of data and consistency group management may occur on a session basis. A session may be defined as including multiple volumes that may be referenced using a session name when the session is started. A master-slave relationship may be assigned to a session so that relationship would apply to all volumes in the session. All volumes defined within a session would be included in the same consistency group.

Figure 3:
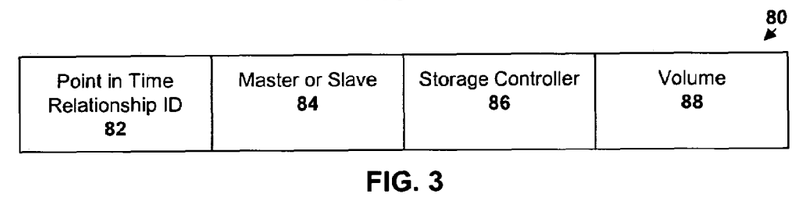
FIG. 3 illustrates relationship information in accordance with implementations of the present invention.

The relationship information 64 may include a plurality of relationship assignments, one for each volume for which the storage controller is designated as a master or slave. FIG. 3 illustrates information included in a relationship assignment 80. A relationship identification field 82 indicates an ID of a consistency group copy relationship because there may be many relationships, each assigned to a group of volumes, across the storage controllers 4A, 4B, 4C. Thus, a storage controller 4A, 4B, 4C may be a master for multiple consistency group relationships or have volumes that are slaves in different relationships. The master-slave field 84 indicates whether the assignment is for a master or slave relationship. If the master-slave indicator 84 specifies "master", then that storage controller, e.g., 4C, including that assignment 80, is a master in the master-slave relationship identified in field 82 for the volume indicated in the volume information 88 managed by the storage controller, e.g., 4A or 4B, indicated in the storage controller information 86. Likewise, if the master-slave indicator 82 specifies "slave", then the volume in the attached storage, e.g., 6A or 6B, indicated in the volume information 88 is a slave in the relationship identified in field 82 to the master storage controller, e.g., 6b, indicated in the storage controller information 86. A master storage controller, e.g., 4C, may be assigned a slave volume that is in storage, e.g., 6A, 6B, attached to another storage controller, e.g., 4A, 4B, or is in the storage, e.g., 6C, attached to the master storage controller, e.g., 4C. Thus, a master may be assigned slave volumes in the attached storage and/or in storage systems attached to other storage controllers. Further, a storage controller may be assigned as a master for volumes in the attached storage and/or storages managed by other storage controllers and, at the same time, include volumes that are assigned as slaves to master, where that master may be the storage controller itself or another storage controller.

Further, the assignment information 64 for a master storage controller would include a relationship record 80 for each slave volume on a slave storage controller, where the slave storage controller and volume would be indicated in fields 86 and 88, respectively. The relationship information may be maintained in a different arrangement and format than shown in FIG. 3 and may be maintained in any data structure known in the art, such as a text or formatted text file, database, etc.

An OOS bitmap 66 includes a bit for each track that the slave storage controllers are to copy over to the corresponding remote storage. During normal copy operations, any writes to a storage controller are recorded in the OOS bitmap 66 and then copied over to the remote storage. The CR bitmap 68 includes a bit for each track to which an update is received during the formation of a consistent set of data, where the formation occurs by the master storage controller, e.g., 4C, managing the slaves, e.g., 4A, 4B, to copy all the data reflected in their OOS bitmaps 66 as of a point-in time. Further, the storage controllers 4A, 4B, 4C may maintain one set of these bitmaps for each volume, or alternatively maintain one set of bitmaps 66, 68 for a group of volumes in the attached storage 6A, 6B, 6C.

Figure 4:
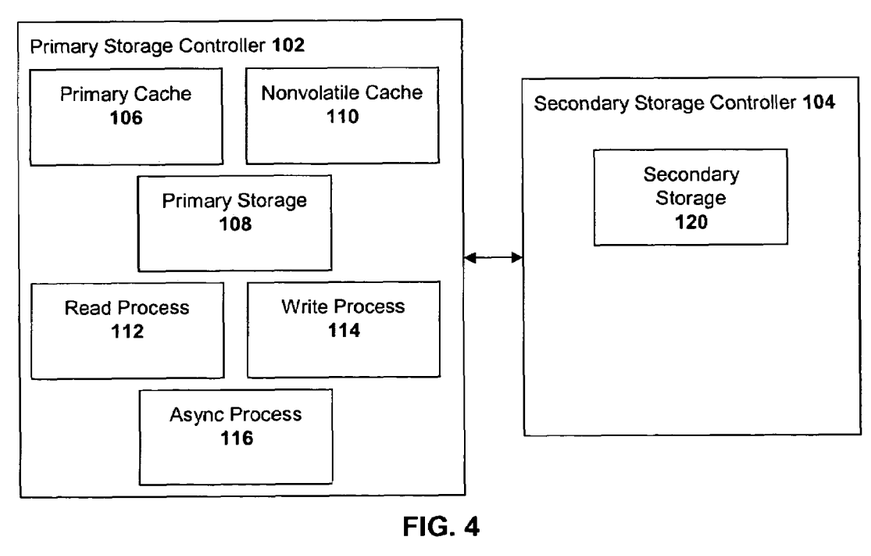
FIG. 4 illustrates component within the storage controllers of FIG. 1 in which aspects of the invention are implemented.

In certain implementations, the storage controllers always run a background process to copy any tracks indicated as updated in their OOS bitmaps to the remote storage. This process continues in the slave controllers even after the formation of a consistency group is initiated and the CR bitmap created. FIG. 4 illustrates further details of the storage controllers 4A, 4B, 4C where each is referred to as a primary storage controller 102 that copies data to a secondary storage controller 104, such as storage controllers 14A, 14B, 14C which receive the data. The primary storage controller 102 includes a primary cache 106 in which updates to tracks in the attached primary storage 108 managed by the primary storage controller 102 such as storages 6A, 6B, 6C are maintained until written to the attached primary storage 108 (i.e., the tracks are destaged). Additionally, the primary storage controller 102 includes a nonvolatile cache 110. The nonvolatile cache 110 may be, for example, a battery backed up volatile memory to maintain a nonvolatile copy of data updates and other information.

The primary storage controller 102 includes a read process 112 for reading data and a write process 114 for writing data. The primary storage controller 102 also includes an async process 116 for transferring data from the primary storage controller 102 to remote storage such as storage at the secondary storage controller 104. In certain implementations, the async process 116 may perform synchronization of data for an asynchronous PPRC Extended Distance service. In certain implementations, there may be multiple async processes (e.g., one async process for each volume on primary storage 108 for PPRC Extended Distance). In certain implementations, the read process 112, write process 114, and async process 116 are implemented as firmware. The secondary storage controller 104 writes the data received from the primary storage controller 102 to secondary storage 120 such as storages 14A, 14B, 14C (FIG. 1). The different processes 112, 114, 116 may be implemented in storage management software 62.

Figure 5:
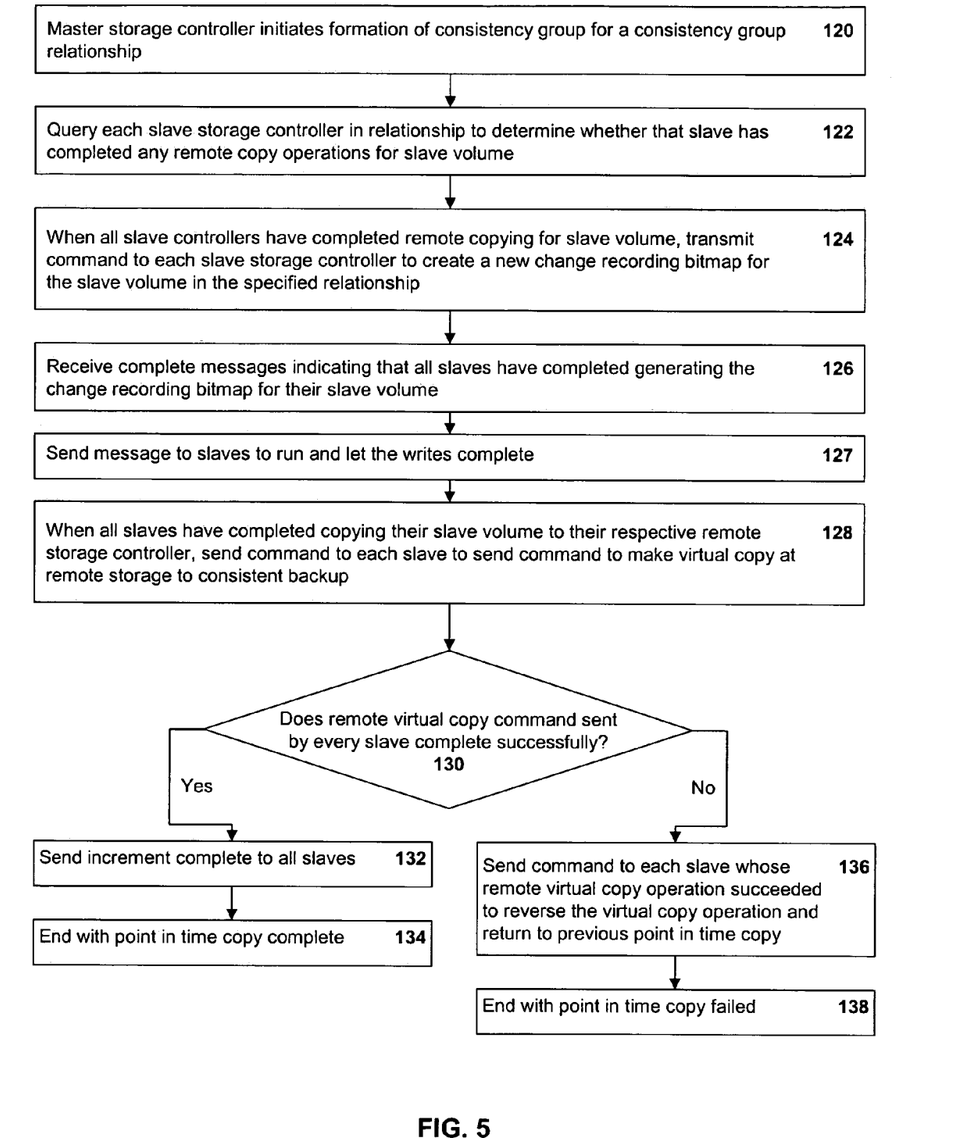
FIGS. 5-9 illustrate operations performed by storage controllers to copy data to a remote site in accordance with the present invention.

FIG. 5 illustrates operations performed by a master storage controller, e.g., 4C, to manage a point in time copy operation. A master storage controller may implement a policy that indicates when the master will initiate the formation of a consistency group to copy the volumes subject to the consistency group relationship. Additionally, the master may initiate consistency group formation operations in response to an administrator command. Upon the master storage controller initiating (at block 100) the formation of a consistency group with respect to a specified consistency group relationship, the master storage controller, e.g., 4C, queries (at block 102) each slave storage controller, e.g., 4A, 4B, in the specified relationship to determine whether that slave has completed any remote copy operations for the slave volume subject to the relationship. As discussed, the master storage controller, e.g., 4C, for the specified relationship would include a relationship record 80 (FIG. 3) for each slave volume in the specified relationship identifying the slave storage controller in field 86 and slave volume 88, where the slave storage controller may be the master or a different storage controller. Upon determining (at block 124) that all slave controllers have completed remote copying for their respective slave volumes, then a command is transmitted to each slave storage controller, e.g., 4A, 4B, to create a new CR bitmap 68 for the slave volume in the specified relationship. The master storage controller may learn that the slaves have completed all remote copying by querying the slaves or by the slaves notifying the master when remote copying is complete.

Figure 6:
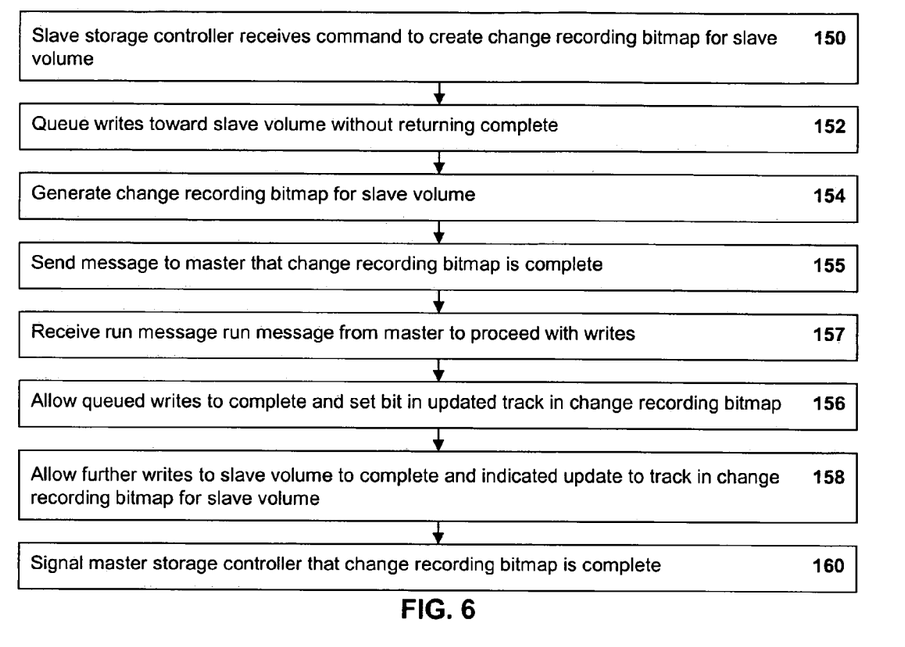

FIG. 6 illustrates operations the slave storage controllers, e.g., 4A, 4B, perform in response to receiving the command to generate the CR bitmap 68 for the slave volume. Upon receiving (at block 150) the command to generate the CR bitmap 68 for the slave volume, the slave storage controller, e.g., 4A, 4B, queues (at block 152) any subsequent writes directed to the slave volume without returning complete. The CR bitmap 68 for the slave volume is generated (at block 154) and a message is sent (at block 155) to the master indicating the initialization of the CR bitmap 68. Upon receiving (at block 157) a message or command from the master storage controller, e.g., 4C, to proceed with writes, queued writes to the slave volume are allowed to complete (at block 156) and the bit for the updated track in the CR bitmap 68 is set to indicated the update. Alternatively, indication of the queued writes may be made to the OOS bitmap 66 instead of the CR bitmap 68. In this way, the formation of the consistency group only delays host writes for a short period of time while the CR bitmap 68 is generated, where such delay during which host writes are queued may not even be noticeable or may appear to the host as a slightly longer write. The slave storage controller, e.g., 4A, 4B, then completes any subsequent writes to the slave volume (at block 158) and indicates the update to the track in the CR bitmap 68 for the slave volume in storage, e.g., 6A, 6B. The slave storage controller, e.g., 4A, 4B, further signals (at block 160) the master storage controller, e.g., 4C, of completing the CR bitmap 68.

FIG. 5 also illustrates the master storage controller, e.g., 4C, receipt (at block 126) of complete messages from all the storage controllers, e.g., 4A, 4B, indicating that they have completed generating the CR bitmap 68 for their slave volumes and then sends (at block 127) a run message to the slave storage controllers to signal them to proceed with their writes.

Figure 7:
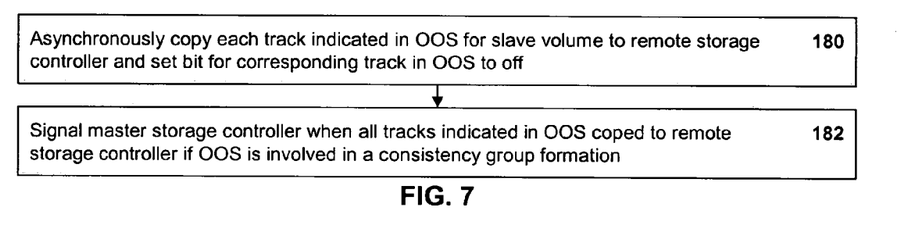

FIG. 7 illustrates operations the slave storage controllers, e.g., 6A, 6B perform when copying the tracks OOS bitmap 66, which occurs as part of an asynchronous background process that continually runs. The slave storage controller a synchronously copies (at block 182) each track indicated in the OOS bitmap 66 for the slave volume to the corresponding remote storage controller, e.g., 8A, 8B, and sets the bit for the corresponding track in the OOS bitmap 66 to "off" when completing the asynchronous copy. The slave storage controller signals (at block 184) the master storage controller when all tracks indicated in the OOS bitmap 66 for the slave volume have been a synchronously copied to the corresponding remote storage controller at the remote site 10 if the OOS bitmap 66 was involved in the formation of a consistency group. If the OOS bitmap 66 did not represent volumes included in a consistency group in the process of being formed, then there may be no notification to the master of the completion of the copying of the tracks for that OOS bitmap 66.

Further, storage controllers a synchronously copying the data indicated in their OOS bitmaps 66 to the remote storage may perform conflict management operations. For instance, if a storage controller 4A, 4B, 4C receives an update to a track whose corresponding bit in the OOS bitmap 66 is set to indicate that there already is an update for that track that has not yet been copied over to the remote site, where such older update may or may not be part of a consistency group, then the storage controller 4A, 4B, 4C may take action to avoid overwriting the older update until such update has been copied over. Such conflict management would ensure an older update that is part of a consistency group is copied to the remote site to ensure consistency at the time of formation of the consistency group. In certain implementations, the storage controller receiving the update may queue the update until the older update is copied over to the remote site. Alternatively, the storage controller may return a "fail" to the update while there is a pending update to copy over. Still further, the storage controller may make a copy of the older update, write the most recent update to the track, and then later copy over the older update from the copy made. Additional details of managing conflicts with updated tracks indicated in the OOS bitmap are describe in the copending and commonly assigned patent application Ser. No. 10/675, 317 entitled "METHOD, SYSTEM, AND PROGRAM FOR ASYNCHRONOUS COPY", which patent application is incorporated herein by reference in its entirety.

With respect to FIG. 5, when the master storage controller, e.g., 4C, determines (at block 108) that all slave storage controllers, e.g., 4A, 4B, have completed copying their slave volume to their respective remote storage controller, e.g., 8A, 8B, the master storage controller sends a command to each slave storage controller to cause the slave controller to, in turn, send a command to cause the respective remote storage controller 8A, 8B to make a copy of the slave volume stored in the remote storage, e.g., 14A, 14B, to the consistent backup storage, e.g., 16A, 16B. In certain implementations, the copy operation from the remote storage 14A, 14B, 14C to the consistent backup 16A, 16B, 16C may comprise a virtual copy operation, such as a FlashCopy® operation (FlashCopy is a registered trademark of IBM). A Flash-Copy® operation involves establishing a logical point in time relationship between source and target volumes on the same or different devices and subsequently copying the data subject to the relationship from the source to target volumes. The FlashCopy® operation guarantees that until a track in a FlashCopy® relationship has been hardened to its location on the target disk, the track resides on the source disk.

Figure 8:
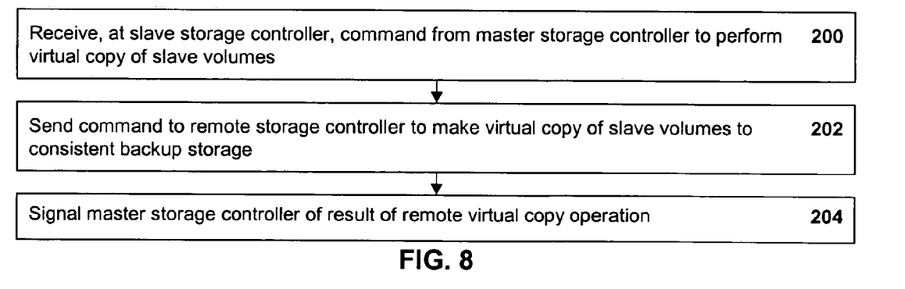

FIG. 8 illustrates operations the slave storage controllers perform in response to receiving (at block 200) the command to cause the virtual copy operations between the remote storage, e.g., 14A, 14B, and the consistent backup, e.g., 16A, 16B. In response to the command, the slave storage controller, e.g., 4A, 4B, sends (at block 202) a command to the corresponding remote storage controller, e.g., 8A, 8B, to cause the remote storage controller to make a virtual copy of the slave volume to the corresponding consistent backup storage, e.g., 16A, 16B. The slave storage controller then signals (at block 204) the master storage controller of the result of the remote virtual copy operation.

With respect to FIG. 5, the master storage controller determines (at block 130) whether the remote virtual copy command sent by every slave storage controller has successfully completed. This may be determined by the master querying the slaves or by the slaves notifying the master when learning the result of the remote virtual copy operation. If (at block 130) all virtual copy operations initiated by all slaves have completed successfully, then an "increment complete" message is sent (at block 132) to every slave storage controller to complete the point in time copy operation and the point in time copy operation ends with "complete" (at block 134). Otherwise, if the virtual copy operation has not completed successfully for all slaves, then the master storage controller sends (at block 136) a command to each slave storage controller whose remote virtual copy operation succeeded to reverse the virtual copy operation and return to previous point in time copy on the consistent backup, e.g., 16A, 16B. Further details of reversing the virtual copy operation are described in co-pending and commonly assigned patent application Ser. No. 10/674,900 entitled "AUTONOMIC INFRASTRUCTURE ENABLEMENT FOR POINT IN TIME COPY CONSISTENCY GROUPS", which application is incorporated herein by reference in its entirety.

Figure 9:
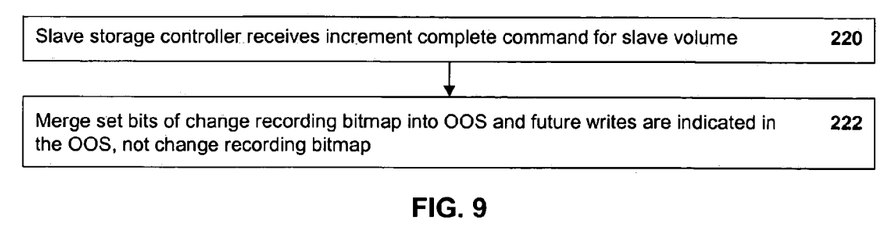

FIG. 9 illustrates operations the slave storage controllers perform in response to receiving (at block 220) the "increment complete" message from the master storage controller. In response, the slave storage controllers merge (at block 222) the set bits of the CR bitmap 68 for the slave volume, indicating updated tracks, into the drained OOS bitmap 66 and subsequent writes to the slave volume are indicated in the OOS bitmap 66, not the CR bitmap 68 which may now be discarded.

With the described implementations, volumes subjected to a consistency group relationship may reside on storage systems managed by different storage controllers. A master storage controller would coordinate the remote copying of data at the different storage controllers when forming the consistency group.

The OOS bitmap 66 and CR bitmap 68 may be used in alternative remote copy environments. For instance, in a single controller environment, without any master-slave relationships, the storage controller may receive a consistency group formation command to copy specified volumes managed by the storage controller to a remote site. In response, the storage controller would queue any further writes while generating the CR bitmap 68. After generating the CR bitmap 68, any queued writes and subsequent writes would be indicated in the CR bitmap 68 and tracks indicated in the OOS bitmap 66 would be copied to the remote site. After the OOS bitmap 66 is drained and the asynchronous remote copy operations are completed, new writes may again be recorded in the OOS bitmap 66, the CR bitmap 68 is merged with the OOS bitmap 66, and then the CR bitmap 68 may be discarded. Further, a virtual copy may be performed at the remote site of the volumes, consistent as of the time of the storage controller receiving the point in time copy command.

The described techniques to form consistency groups may be implemented as a method. apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., OD-ROMs, optical disks, etc.), volatile and non-volatile memory devices (e.g., EEPROMs, ROMs, PROMs, RAMs, DRAMs, SPAMs, firmware. programmable logic, etc.). Code in the computer readable medium is accessed and executed by a processor. The code in which implementations are made may further be accessible through a transmission media or from a file server over a network. Of course, those skilled in the art will recognize that many modifications may be made to this configuration without departing from the scope of the implementations and that the article of manufacture may comprise any information bearing medium known in the art.

II. Detailed Description of Method for Recovery from Local Site Failure

Figure 11:
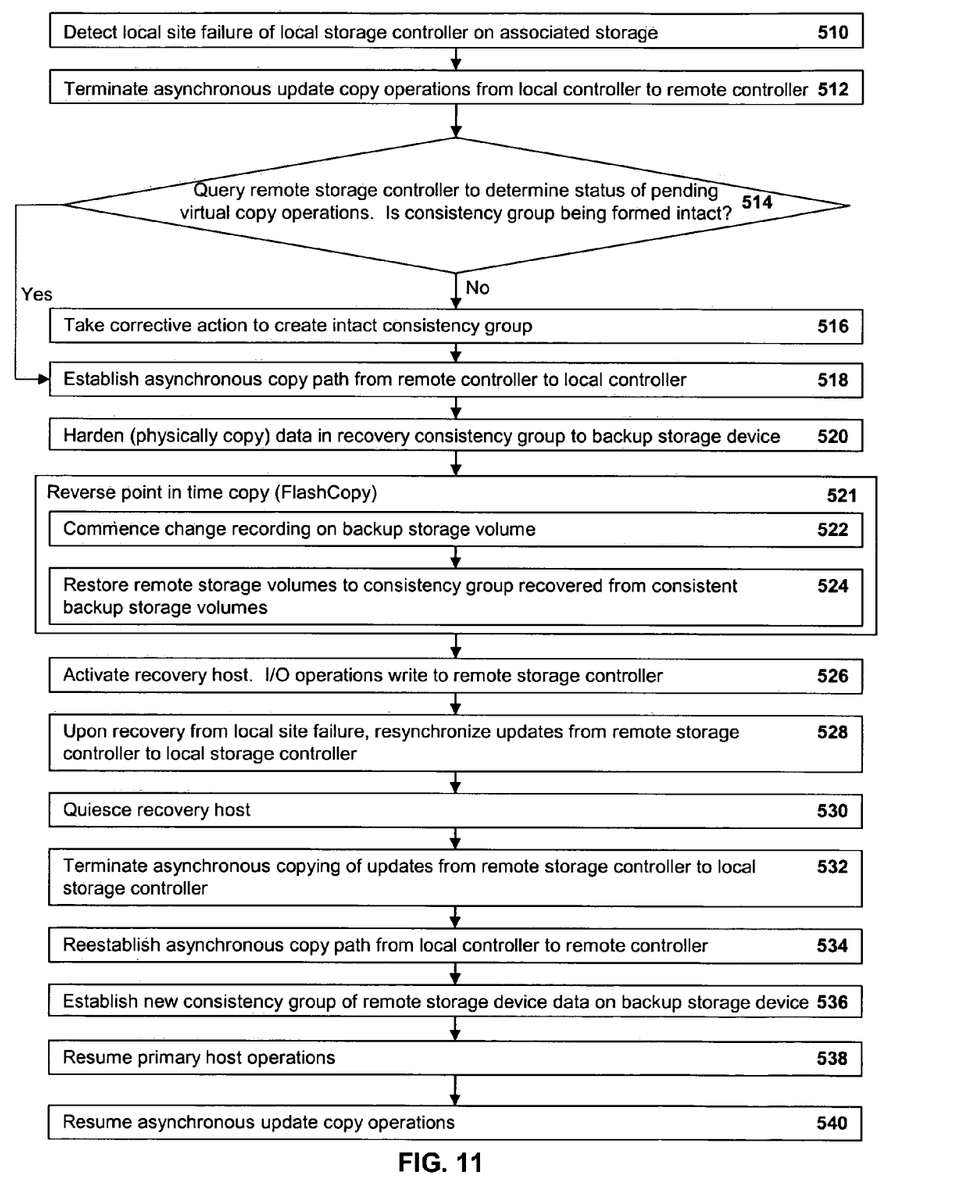
FIG. 11 illustrates operation performed by the storage controllers to recover from a local site failure.

A generalized illustration of a method for recovery from a failure associated with a local site 2 is shown in FIG. 11. As discussed in detail above, the local site 2 may have storage controllers, e.g., 4A, 4B, 4C, connected by a local network 18. In addition, each storage controller 4A, 4B, 4C may have an associated storage device 6A, 6B, 6C. The failure associated with the local site 2 may be a failure of any one or more of these components, which make up the local site. As is described in detail above and as is shown in FIG. 1, each local storage controller 4A, 4B, 4C communicates over a connection 12A, 12B, 12C to a remote storage controller 8A, 8B, 8C. The remote storage controllers are associated with remote storage devices 14A, 14B, 14C and consistent backup storage devices 16A, 16B, 16C. To enhance the simplicity and clarity of the discussion below, the present invention of a method for recovery from a local site failure shall be limited to a discussion of a local site 2 having a single local storage controller 4 associated with a local storage device 6. Similarly, for the purposes of the discussion below, the description of the remote site 10 shall be limited to a remote site 10 having a single remote storage controller 8 associated with a remote storage device 14 and a backup storage device 16. This convention employed to simplify the discussion of the recovery system and method should in no way be construed as limiting upon the scope of the invention which is wholly applicable to a system for copying data which features multiple master and slave storage controllers and multiple storage devices configured across multiple sites.

When the failure associated with the local site 2 occurs, the balance of the data storage system is initially unaware of the failure. High availability cluster multiprocessing (HACMP), geographically dispersed parallel sysplex (GDPS), or other management software detects the failure associated with the local site 2 (step 510). Upon detection of the failure associated with the local site 2, asynchronous update copy operations from the local storage controller 4 to the remote storage controller 8 must be terminated (step 512). In addition, once the failure associated with the local site 2 has occurred, the storage management software 62 associated with a local storage controller 4 will no longer be able to form consistency groups which include the local storage device 6. Therefore, it is necessary to query the remote storage controller 8 to determine the status of virtual copy operations pending at the time of the local site failure (step 514), and thereby determine the status of any consistency group which may have been in formation at the time of the failure.

In addition to querying the remote storage controller 8 to determine the status of pending consistency group formation, corrective action can be taken on any pending consistency group to create an intact consistency group as a basis for further recovery operations (step 516). The corrective action may consist of completing the pending consistency group. Alternatively, the corrective action may consist of withdrawing the pending consistency group and/or allowing reversion to a prior intact consistency group. Finally, the corrective action may consist of taking no action and allowing the pending consistency group to become the intact consistency group. Preferably, a tape or other type of secondary backup of the backup storage device 16 should be made after the status of the consistency group formation is checked and corrective action is taken. The tape or other secondary backup ensures a safe copy is preserved before proceeding with the recovery process.

At this point in time, the pending intact consistency group is a logical consistency group, meaning that it exists on the remote storage controller 8 but has not yet been physically copied to the backup storage device 16. Before the recovery process can continue, the pending intact consistency group must be hardened (physically copied to) on the backup storage device 16 (step 520) creating a recovery consistency group.

In addition to the preliminary steps described above, an asynchronous update copy relationship from the remote storage controller 8 to the local storage controller 4 must be established prior to activation of the recovery host 20 (step 518). The reverse asynchronous update copy relationship may be established by the issuance of a failover command to the remote storage controller 8 establishing a remote to local copy path. Preferably, all failover operations must be completed before continuing with the next step. In addition, this command suspends the relationship between the remote storage controller 8 and the local storage controller 4 and causes changes to the remote storage device 14 to be reflected in an OOS bitmap 66.

Next, change recording must be enabled on the backup storage device 16 to record post failure updates processed by the remote storage controller 8 and thus avoid a full volume copy from the remote storage device 14 to the backup storage device 16 when the original configuration is restored (step 522). In addition, a reverse point in time copy relationship which can be a reverse FlashCopy relationship may be initiated between the backup storage device 16 and the remote storage device 14 to assure that the remote storage device 14 is operating with the recovery consistency group recovered from the backup storage device 16 (step 524). The reverse point in time (FlashCopy) operation causes the remote storage device 14 to become a target for the backup storage device 16. Therefore, the CR bitmap 68 of the remote storage device 14 (which represents changes on tracks of the remote storage device 14 received from the local storage device 6 that are not in the consistent copy) will be merged into both the target bitmap 69 and the OOS bitmap 66 of the remote storage device 14 and subsequently zeroed. Thus, the remote storage device 14 becomes a copy of the backup storage device 16 (the consistent copy). These mapped updates also represent changed data on the local storage device 6. Therefore, these updates are marked in the remote storage device 14 OOS bitmap 66 such that the updates will be reset on the local storage device 6 in later steps. In addition, the backup storage device CR bitmap 68 will be reflecting recovery host 20 activity on the backup storage device 16 once the recovery host 20 is brought up in the next step.

Upon completion of the above preliminary steps and operations, the recovery host 20 can be activated. The customer will be using the consistency group recovered from the backup storage device 16. The recovery host 20 preferably will run the customer's application and allow customer operations during the time that the local site failure is being repaired. The recovery host I/O operations can be configured to write data which is processed by the remote storage controller 8 (step 526) and stored. Between the time that the recovery host I/O operations begin writing through the remote storage controller 8 and the time that the failure associated with the local site 2 is repaired, the identity of tracks containing post failure data updates on the remote storage device 14 are identified with the OOS bitmap 66 and CR bitmap 68 associated with the remote storage controller 8.

Upon recovery from the local site failure, and prior to the resumption of normal operations, the local storage device 6 must be resynchronized with the remote storage device 14 (step 528). When the local storage devices 6 is ready to return, the OOS bitmap 66 of the local storage controller 4 can be merged with the OOS bitmap 66 of the remote storage controller 8 to assure that updates written to either controller prior to or after the failure are accounted for as part of the resynchronization process.

In particular, resynchronization of the local storage device 6 may be accomplished through the following steps which will allow for resynchronization using existing storage system functions. A failback command can be issued to the remote storage controller 8. This command causes the OOS bitmap 66 from the local storage controller 4 to be merged with the OOS bitmap 66 of the remote storage controller 8 before the remote to local volume pairs are reestablished. When the merger is complete, the resynchronization from the remote storage device 14 to the local storage device 6 will be started. Resynchronization occurs by either the asynchronous or the synchronous copying of changed data stored on tracks identified by the OOS bitmap 66 of the remote storage controller 8 to the local storage device 6.

Once the remote storage controller 8 has completed a first resynchronization pass through its OOS bitmap 66, recovery host 20 operations (which are still directed at the backup storage device 16) may be quiesced. Subsequently, the remaining bits can be allowed to drain from the OOS bitmap 66, causing the OOS bitmap 66 to read all zeroes. At this time, the CR bitmap 68 associated with the remote storage controller 8 (presently all zeroes) will continue recording changes written in the following steps. Next, the remote to local volume pairs can be reversed to the pre-failure configuration again by issuing a failover command and then a failback command to the local storage device 6. New updates are still recorded in the CR bitmap associated with the remote storage controller 8. Subsequently, a reverse FLC restore command (FlashCopy restore) can be issued to reverse the direction of the FlashCopy relationship to the pre-failure configuration and to establish a new consistency group on the backup storage device 16. As part of this process, the updates to the remote storage device 14 (recorded in the CR bitmap 68) will be merged with the backup storage device target bitmap 69 so the FlashCopy function is signaled to copy the updated tracks. At this point in time, the local storage device 6 is a synchronized copy of the remote storage device 14, which is a synchronized copy of the backup storage device 16. Thereupon, primary host operations may be resumed (step 538). Finally, the pre-failure asynchronous PPRC mechanism can be reinitiated. Since change recording had been maintained during the recovery process to track changes made from the point in time that the recovery consistency group was hardened, the establishment of a new consistency group on the backup storage device 16 can be accomplished without the need for a full volume copy. If the recovery process becomes corrupted, the recovery consistency group may still be available if a tape copy was made as discussed above.

The above implementations were described with respect to the IBM PPRC Extended Distance computing environment. However, the described implementations for maintaining consistency during recovery processes could be applied to maintain consistency in other computing and vendor environments and using other data copying protocols and programs than described herein.

In certain implementations, data in the storage devices is arranged in volumes. In alternative systems, the storage areas on which data is maintained may be grouped according to storage units other than volumes that are grouped in groupings other than sessions for the purpose of maintaining consistency.

In described implementations, the storage units designated as the slaves in the master-slave copy relationship comprised volumes. In alternative implementations, other storage unit values may be assigned as a slave to a master where such storage units may comprise tracks in a volume, blocks, logical subsystems, logical drives, or any other physical or logical storage unit designation known in the art.

In described implementations, data updates were organized in consistency groups before being transferred from one storage controller to another. In alternative implementations, the data copied between the different storage controllers may not comprise a consistency group.

The described operations for forming a consistency group may be used in a critical data environment where high availability is paramount. However, those skilled in the art will appreciate that the point in time copy operations described herein may apply to storage systems used for non-critical data where high availability is not absolutely necessary.

In the described implementations, each storage controller copies data to a corresponding remote storage controller having an attached remote storage system. In alternative implementations, multiple storage controllers at the local or intermediate site may copy data to one remote storage controller where a single remote storage controller may receive point in time data from multiple local or intermediate storage controllers.

The illustrated logic of FIGS. 5-9 and FIG. 11 show certain events occurring in a certain order. In alternative implementations, certain operations may be performed in a different order, modified, or removed. Moreover, steps may be added to the above described logic and still conform to the described implementations. Further, operations described herein may occur sequentially or certain operations may be processed in parallel. Yet further, operations may be performed by a single processing unit or by distributed processing units.

Figure 10:
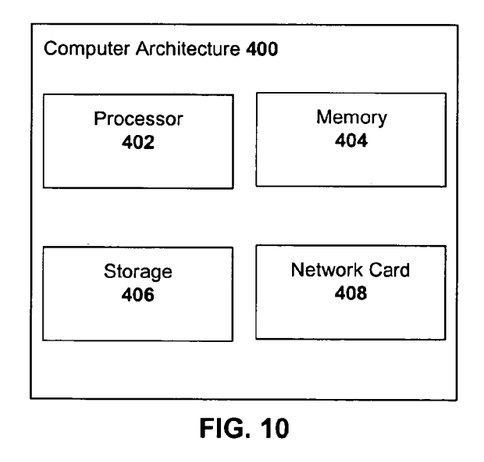
FIG. 10 illustrates an architecture of computing components in the network environments, such as the storage controllers, used with implementations of the present invention.

FIG. 10 illustrates one implementation of a computer architecture 400 of the network components such as the storage controllers shown in FIGS. 1 and 9. The architecture 400 may include a processor 402 (e.g., a microprocessor), a memory 404 (e.g., a volatile memory device), and storage 406 (e.g., a non-volatile storage such as magnetic disk drives, optical disk drives, a tape drive, etc.). The storage 406 may comprise an internal storage device or an attached network accessible storage. Programs in the storage 406 are loaded into the memory 404 and executed by the processor 402 in a manner known in the art. The architecture further includes a network card 408 to enable communication with a network. An input device 410 is used to provide user input to the processor 402 and may include a keyboard, mouse, pen-stylus, microphone, touch sensitive display screen, or any other activation or input mechanism known in the art. An output device 412 is capable of rendering information transmitted from the processor 402 or other component such as a display monitor, printer, storage, etc.

The foregoing description of various implementations of the invention has been presented for the purposes of illustration and description. It is not intended to be exhaustive, nor to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of recovery from a data storage system failure in a data storage system having a host computer writing updates to a local storage controller associated with a local storage device at a local site, the local storage controller a synchronously copying the updates to a remote storage controller at a remote site, the remote storage controller storing the updates on a remote storage device and periodically storing a consistent point in time copy of the updates on a backup storage device, the method comprising:
   detecting a failure associated with the local site;
   terminating copying the updates from the local storage controller to the remote storage controller;
   establishing a reverse asynchronous copy relationship from the remote storage controller to the local storage controller;
   determining whether an intact consistency group exists on the backup storage device at the time the failure is detected;
   forming a new intact consistency group if an intact consistency group does not exist on the backup storage device at the time the failure is detected;
   removing inconsistent data from the remote storage device by performing a reverse point in time copy operation from the backup storage device to the remote storage device;
   recording post-failure updates processed by the remote storage controller;
   correcting the failure associated with the local site; and
   copying changed data from the remote storage device to the local storage device to resynchronize the local storage device with the remote storage device.

2. The method of claim 1 further comprising the following steps upon detecting the failure associated with the local site:
   terminating the asynchronous copying of updates from the local storage controller to the remote storage controller;
   establishing a reverse asynchronous update copying relationship from the remote storage controller to the local storage controller; and
   quiescing the host computer.

3. The method of claim 1 further comprising taking corrective action on the updates pending for storage on the backup device to create an intact consistency group, wherein the corrective action taken is selected from a group of actions comprising issuing a FlashCopy commit command to complete and harden a new consistency group and issuing a Flashcopy revert command to roll back to a prior consistency group.

4. The method of claim 1 further comprising physically copying to the backup storage device the updates in the intact consistency group, thereby forming a recovery consistency group and tracking changes involved in forming the recovery consistency group.

5. The method of claim 1 further comprising writing post-failure updates directly to the remote storage controller and tracking the post-failure updates in preparation for resynchronization to the local storage device.

6. The method of claim 5 wherein the post-failure updates are written to the remote storage controller from a remote host.

7. The method of claim 5 further comprising the following steps after the local storage device is re-synchronized:
terminating the asynchronous copying of updates from the remote storage controller to the local storage controller;
re-establishing the asynchronous copy relationship from the local storage controller to the remote storage controller; and
storing a new consistent copy of the data on the remote storage device to the backup storage device.

8. The method of claim 1 wherein re-synchronizing the local storage device comprises synchronizing the local storage device with the recovery consistency group and the post-failure updates by the asynchronous copying of updates from the recovery storage controller to the local recovery controller.

9. A system for copying stored data and having the ability to recover from a failure comprising:
means for detecting a failure associated with a local storage site having a local storage controller and a local storage device;
means for copying changed data from a remote storage device to the local storage device to resynchronize the local storage device with the remote storage device after the failure is corrected; and
a remote storage controller having:
means for a synchronously receiving updates from the local storage controller;
means for writing the updates to a remote storage devices;
means for storing a consistent point in time copy of the updates on a backup storage device;
means for terminating copying the updates from the local storage controller to the remote storage controller;
means for establishing a reverse asynchronous copy relationship from the remote storage controller to the local storage controller;
means for determining whether an intact consistency group an intact consistency group exists, upon detection of the failure associated with the local site forming a new intact consistency group if an intact consistency group does not exist on the backup storage device at the time the failure is detected;
means for removing inconsistent data from the remote storage device;
means for recording post-failure updates processed by the remote storage controller;
means for performing a reverse point in time copy operation from the backup storage device to the remote storage device by performing a reverse point in time copy operation from the backup storage device to the remote storage device; and
means for copying changed data from the remote storage device to the local storage device to resynchronize the local storage device with the remote storage device.

10. The system for copying stored data of claim 9 wherein the remote storage controller further comprises means for taking corrective action on the group of pending updates to create an intact consistency group, wherein the corrective action taken is selected from a group of actions comprising issuing a FlashCopy commit command to complete and harden a new consistency group and issuing a Flashcopy revert command to roll back to a prior consistency group.

11. The system for copying stored data of claim 9 further comprising a recovery consistency group physically stored on the backup storage device, formed from the intact consistency group whereby changes involved in forming the recovery consistency group are tracked.

12. The system for copying stored data of claim 11 further comprising a remote host.

13. The system for copying stored data of claim 12 wherein the remote storage controller receives post-failure data updates directly from the remote host.

14. The system for copying stored data of claim 13 wherein the means for re-synchronizing the local storage device after the failure is corrected comprises means for a synchronously copying of post-failure updates and updates in the recovery consistency group from the remote storage controller to the local storage controller.

15. The system for copying stored data of claim 13 wherein the remote storage controller further comprises means for merging post-failure updates written to the remote storage device with the recovery consistency group on the backup storage device, creating a new consistency group.

16. An article of manufacture for use in programming a data storage system to recover from a failure, the data storage system having a host computer writing updates to a local storage controller associated with a ocal storage device, at a local site having a local storage device, the local storage controller a synchronously copying the updates to a remote storage controller at a remote site, the remote storage controller storing the updates on a remote storage device and periodically storing a consistent point in time copy of the updates on a backup storage device, the article of manufacture comprising a storage medium having logic embedded therein to cause components of the data storage system to:
detect a failure associated with the local site;
terminate copying the updates from the local storage controller to the remote storage controller;
establish a reverse asynchronous copy relationship from the remote storage controller to the local storage controller;
determine whether an intact consistency group exists on the backup storage device at the time the failure is detected;
form a new intact consistency group if an intact consistency group does not exist on the backup storage device at the time the failure is detected;
removing inconsistent data from the remote storage device by performing a reverse point in time copy operation from the backup storage device to the remote storage device; recording post-failure updates processed by the remote storage controller;
correct the failure associated with the local site; and
copy changed data from the remote storage device to the local storage device to resynchronize the local storage device with the remote storage device.

17. The article of manufacture of claim 16 wherein the logic further causes components of the data storage system to take the following steps upon detecting the failure associated with the local site:
   terminate the asynchronous copying of updates from the local storage controller to the remote storage controller;
   establish a reverse asynchronous update copying relationship from the remote storage controller to the local storage controller; and
   quiesce the host computer.

18. The article of manufacture of claim 16 wherein the logic further causes components of the data storage system to take corrective action on the updates pending for storage on the backup storage device to create an intact consistency group, wherein the corrective action taken is selected from a group of actions comprising issuing a FlashCopy commit command to complete and harden a new consistency group and issuing a Flashcopy revert command to roll back to a prior consistency group.

19. The article of manufacture of claim 16 wherein the logic further causes components of the data storage system to physically copy to the backup storage device the updates in the intact consistency group, thereby forming a recovery consistency group and track changes involved in forming the recovery consistency group.

20. The article of manufacture of claim 16 wherein the logic further causes components of the data storage system to write post-failure updates directly to the remote storage controller and track the post-failure updates in preparation for resynchronization to the local storage device.

21. The article of manufacture of claim 20 wherein the logic further causes components of the data storage system to write the post-failure updates to the remote storage controller from a remote host.

22. The article of manufacture of claim 20 wherein the logic further causes components of the data storage system to take the following steps after the local storage device is re-synchronized:
   terminate the asynchronous copying of updates from the remote storage controller to the local storage controller;
   re-establish the asynchronous copy relationship from the local storage controller to the remote storage controller; and
   store a new consistent copy of the data on the remote storage device to the backup storage device.

23. The article of manufacture of claim 16 wherein the logic further causes components of the data storage system to re-synchronize the local storage device by synchronizing the local storage device with the recovery consistency group and the post-failure updates through the asynchronous copying of the updates from the recovery storage controller to the local recovery controller.

* * * * *